United States Patent [19]
Fischer

[11] 3,740,961
[45] June 26, 1973

[54] OPEN CYCLE AMMONIA REFRIGERATION SYSTEM

[75] Inventor: Harry C. Fischer, Royal Oak, Md.
[73] Assignee: Allied Chemical Corporation, New York, N.Y.
[22] Filed: May 22, 1972
[21] Appl. No.: 255,467

[52] U.S. Cl. .................................................. 62/7
[51] Int. Cl. ......................................... F25b 19/00
[58] Field of Search .......................................... 62/7

[56] References Cited
UNITED STATES PATENTS

| | | | |
|---|---|---|---|
| 1,905,971 | 4/1933 | Davisson | 62/7 |
| 2,120,166 | 6/1938 | Tonkin | 62/7 |
| 2,795,937 | 6/1957 | Sottler | 62/7 |
| 2,908,143 | 10/1959 | Price | 62/7 |
| 3,565,201 | 2/1971 | Petsinger | 62/7 |

Primary Examiner—William J. Wye
Attorney—Patrick L. Henry

[57] ABSTRACT

This invention provides an improved open cycle ammonia refrigeration system of the type wherein ammonia, supplied from a refillable storage tank, is employed as a refrigerant, and after serving as the refrigerant, is disposed of by combustion in a burner. The improved system includes, in parallel flow arrangement, a constant pressure expansion valve and means for regulating the flow of ammonia through the system. The regulating means includes a solenoid valve actuated by a thermostat in the compartment being refrigerated. The expansion valve permits a flow of ammonia sufficient to sustain combustion when the solenoid valve is closed. The regulating means prevents overload of the burner due to too rapid flow of ammonia through the system and prevents liquid ammonia from entering the burner.

10 Claims, 3 Drawing Figures

OPEN CYCLE AMMONIA REFRIGERATION SYSTEM

BACKGROUND OF THE INVENTION

Belgian Pat. 772,577, corresponding to U.S. application, Ser. No. 75,646, filed Sept. 25, 1970, now U.S. Pat. No. 3,685,310, discloses an open cycle refrigeration system wherein anhydrous ammonia, supplied from a refillable storage tank, is employed as a refrigerant, and after serving as the refrigerant, is disposed of by combustion in a burner. Although the refrigeration system has definite advantages over conventional closed cycle systems, there are certain problems inherent in the open cycle ammonia system.

As supplied commercially, anhydrous ammonia contains minor amounts of water and oil. In the refrigeration system described in Belgian Pat. 772,577, the water and oil accumulate in the evaporator of the refrigeration system and therefore must be drained periodically from the system. Draining the accumulated water and oil is a separate manual operation which impairs the efficiency of the system.

Commercially supplied anhydrous ammonia also may contain foreign particulate matter. It has been found that filtration of the liquid ammonia at ambient temperature fails to remove foreign matter having a particle size of less than about ten microns, such as fine rust particles. Such fine particles present a problem because they tend to foul valves in the system.

Another problem inherent in the system is that a minimum flow of ammonia must be maintained in order to sustain combustion. In the refrigeration system of Belgian Pat. 772,577, this minimum flow is provided by drawing ammonia directly from the storage tank to the burner, which, of course, provides no refrigeration value. It would not be possible to pass the minimum flow of ammonia through the evaporator because the minimum flow is needed at a time when the flow of ammonia through the evaporator is arrested by a thermostatic throttling valve located downstream from the evaporator.

A fourth problem inherent in the system is that of preventing overload of the burner due to too rapid flow of ammonia through the system. In the refrigeration system of Belgian Pat. 772,577, capillary tubing is used in an attempt to limit the flow of ammonia to prevent overload of the burner, but since the pressure upstream from the capillary tubing is variable depending on ambient temperature, the flow of ammonia is likewise variable.

It is an object of this invention to overcome these problems by providing improvements to the refrigeration system described in Belgian Pat. 772,577.

SUMMARY OF THE INVENTION

The improved refrigeration system of this invention comprises:

a. a storage tank for liquid ammonia, b. an evaporator wherein the liquid ammonia is vaporized by absorbing heat from within the compartment being refrigerated, c. a first conduit for conveying liquid ammonia from the storage tank to the evaporator, d. means for combusting the vaporized ammonia, e. a second conduit for conveying the vaporized ammonia from the evaporator to the means for combusting the vaporized ammonia, the vaporized ammonia being permitted to flow unrestricted from the evaporator to the means for combusting the vaporized ammonia, f. interposed in the first conduit in parallel flow arrangement, an automatic expansion valve and means for regulating the flow of ammonia through the refrigeration system, said automatic expansion valve being set at a pressure such that the flow of ammonia through the valve is substantially equal to that required to sustain combustion in the means for combusting vaporized ammonia.

DETAILED DESCRIPTION

Figure 1:
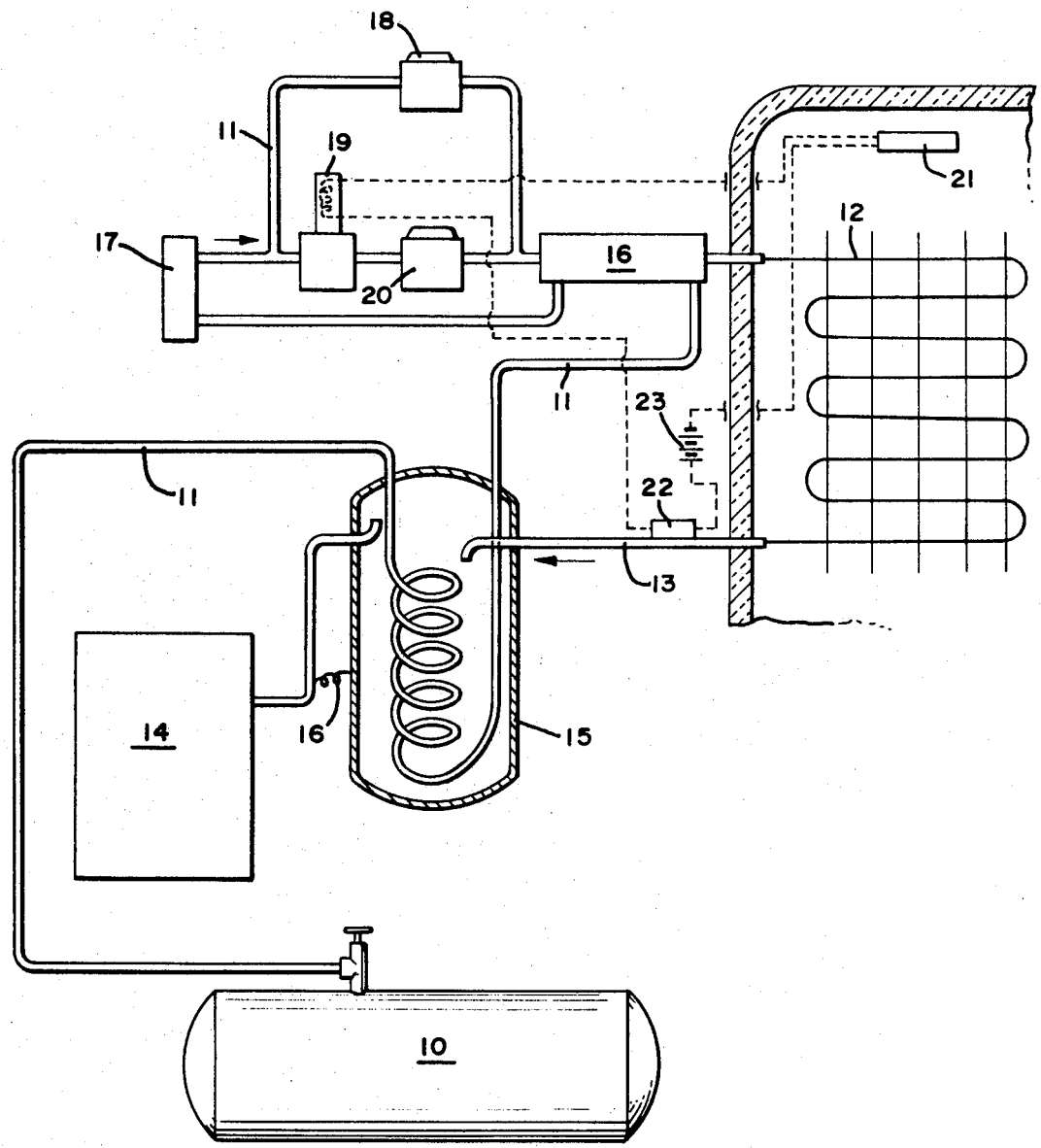
FIGS. 1, 2 and 3 are schematic drawings of embodiments of the invention.

Referring to FIG. 1, liquid anhydrous ammonia flows from an ammonia storage tank 10 through a first conduit 11 to an evaporator 12 wherein the ammonia changes to a vapor as it absorbs heat from the compartment being refrigerated. The vaporized ammonia leaving the evaporator 12 flows through a second conduit 13 to means for combusting the vaporized ammonia 14.

Interposed in the second conduit 13 is an accumulator 15 wherein liquid ammonia (if any) water and oil are separated from the vaporized ammonia. Water and oil are bled from the accumulator 15 through capillary tube 16 to the means for combusting the vaporized ammonia 14. The accumulator 15 is desirable but not essential. Hence, it can be omitted or replaced with a conventional heat exchanger.

Water and oil, inherently contained in the anhydrous liquid ammonia, are entrained with the vaporized ammonia since the ammonia flows unrestricted from the evaporator 12 to the means for combusting vaporized ammonia 14. This feature of the invention represents an improvement over the refrigeration system of Belgian Pat. 772,577, wherein the oil and water accumulated in the evaporator, from which they had to be drained periodically.

A section of first conduit 11 passes through the accumulator 15 in heat exchange relationship with the vaporized ammonia. After flowing through the accumulator 15, the liquid ammonia flows through a heat exchanger 16 and thence through a filter 17. It has been found, surprisingly, that when the ammonia is cooled in the heat exchanger 16, oil inherently contained in the ammonia coalesces with foreign particulate matter to form a substance which is readi'y removed by filtration. The heat exchanger 16 and filter 17 are unnecessary when high purity ammonia is used.

Interposed in first conduit 11 in parallel flow arrangement are (1) a first automatic exansion valve 18 and (2) a solenoid valve 19 and a second automatic expansion valve 20. The first expansion valve 18 is set at a pressure such that the flow of ammonia through the valve is substantially equal to that required to sustain combustion in the means for combusting vaporized ammonia 14. Typically, this pressure is about 0.2 psig. This feature of the invention represents an improvement over the refrigeration system of Belgian Pat. 772,577, wherein the ammonia required to sustain combustion flows directly from the storage tank to the burner without providing refrigeration.

Figure 3:
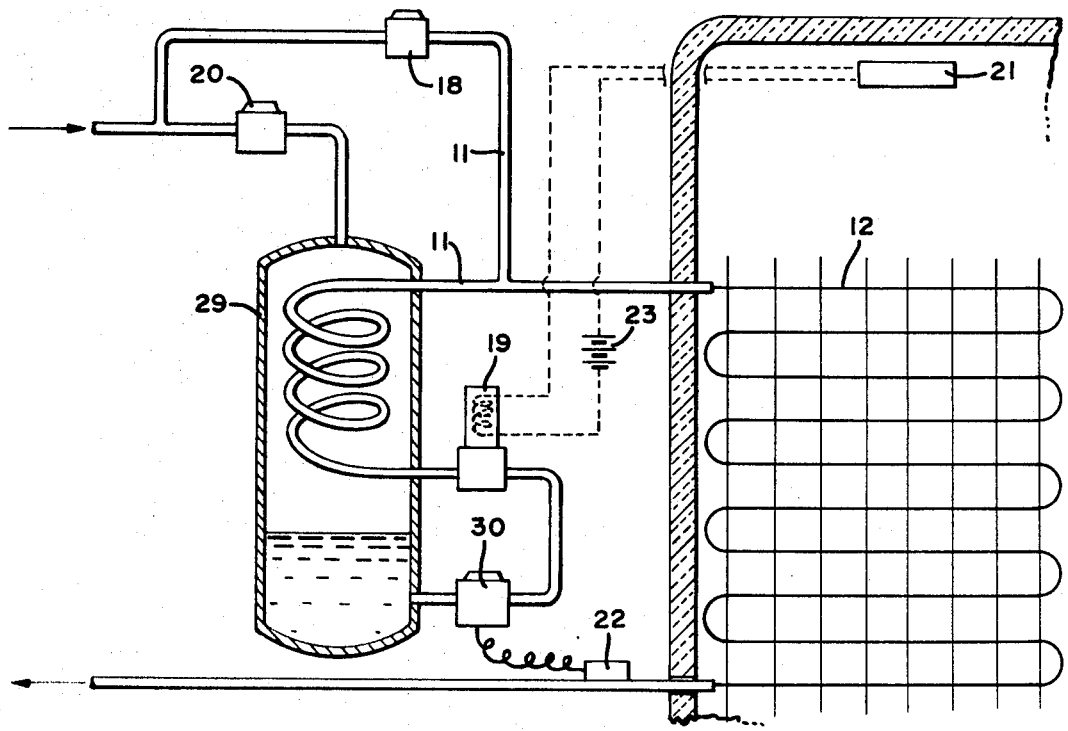

The solenoid valve 18 is actuated by a first thermostat 21 in the compartment refrigerated by the evaporator 12. As the temperature in the compartment rises above the desired temperature, the valve 19 opens to permit flow of ammonia; and as the temperature falls to the desired temperature, the valve 19 closes to prevent flow of ammonia. The valve is also actuated by a second thermostat 22 in heat exchange relationship with the ammonia leaving the evaporator 12. As the temperature of the ammonia approaches that of liquid ammonia (about −28°F.), the valve 19 closes to prevent liquid ammonia from entering the means for combusting vaporized ammonia 14. Alternatively, instead of actuating the solenoid valve 19, the second thermostat 22 can actuate a thermostatic expansion valve, as shown in FIG. 3.

The solenoid valve 19 and the two thermostats 21 and 22 are connected in series to a battery 23 or other suitable source of electricity.

The second automatic expansion valve 20 is set at a pressure such that the flow of ammonia through the valve 20 is not substantially greater than the combustion capacity of the means for combusting vaporized ammonia 14. Typically, this pressure is about 1 or 2 psig.

Suitable means for combusting vaporized ammonia are described in detail in Belgian Pat. 772,577. Preferably, the means for combusting the vaporized ammonia is an ammonia dissociator-burner comprising, within an insulated housing defining a combustion chamber, a conduit containing a catalyst for partially dissociating the vaporized ammonia and having an aperture permitting discharge and combustion of the partially dissociated ammonia such that the heat of combustion maintains the catalyst at a temperature at which ammonia is dissociated in the presence of the catalyst. Such a dissociator-burner is described in greater detail in Belgian Pat. 772,577.

Figure 2:
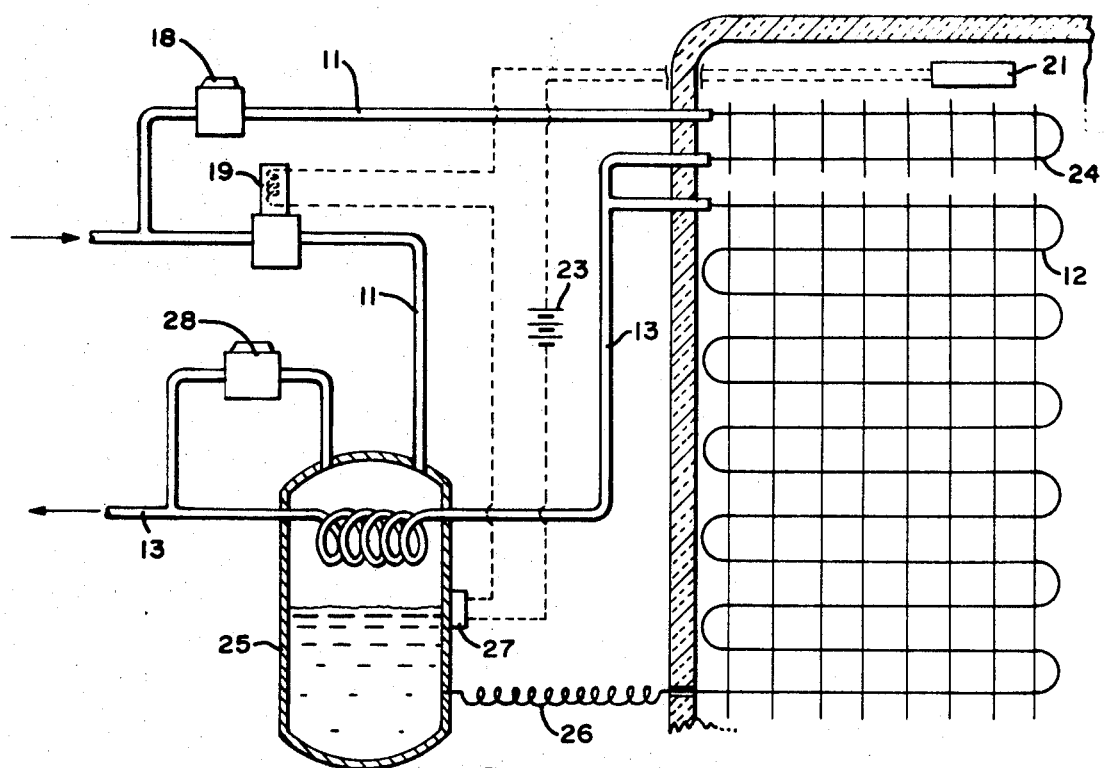

FIG. 2 illustrates a second embodiment of the invention. The ammonia storage tank 10, accumulator 15, and means for combusting vaporized ammonia 14 shown in FIG. 1 remain unchanged in the second embodiment, and therefore are omitted from FIG. 2.

The first first automatic expansion valve 18 is also the same as shown in FIG. 1, but in the embodiment shown in FIG. 2, the ammonia flows from the valve 18 to an auxiliary evaporator 24, thereby bypassing the main evaporator 12. The auxiliary evaporator 24 is insufficient to satisfy the refrigeration requirements of the compartment. An advantage of the auxiliary evaporator 24 is that it permits the main evaporator 12 to defrost when the solenoid valve 19 is closed. Similarly, when the solenoid valve 19 is open, the pressure of vaporized ammonia leaving the evaporator 12 would normally be greater than the pressure at which expansion valve 18 is set so that no ammonia would flow through auxiliary evaporator 24, thereby permitting it to defrost. Defrosting would occur, of course, only when the temperature in the refrigerated compartment is above freezing. The auxiliary evaporator 24 can be employed in any embodiment of the invention disclosed herein.

As in the embodiment shown in FIG. 1, the solenoid valve 19 controls the flow of ammonia to the evaporator 12 in response to the temperature in the refrigerated compartment, as detected by the thermostat 21 therein. However, instead of employing a second thermostat to regulate the flow of ammonia in response to the temperature of the ammonia leaving the evaporator 12, the embodiment shown in FIG. 2 employs other means. The regulating means includes a feed tank 25 to which the ammonia flows from the solenoid valve 19, and from which the ammonia flows to the evaporator 12 through a capillary tube 26.

The level of liquid ammonia in the feed tank 25 is controlled by a float switch 27 which actuates the solenoid valve 19. The float switch 27, solenoid valve 19 and thermostat 21 are connected in series to a battery 23.

Vapor pressure in the feed tank 25 above a desired value is released through a relief valve 28 to the second conduit 13. The pressure at which the relief valve 28 is set is that at which the flow of ammonia through the capillary tube 26 is substantially equal to the combustion capacity of the means for combusting vaporized ammonia 14. Typically, the pressure at which the relief valve would be set would be about 15 psig.

As the compartment is cooled, the evaporator becomes more fully flooded until at some time, either before or after the solenoid valve 19 is closed by the thermostat 21, liquid ammonia begins to be carried over into the second conduit 13. To prevent liquid ammonia from entering the means for combusting vaporized ammonia 14, a section of the second conduit 13 passes through the feed tank 25 in heat exchange relationship with the ammonia vapor therein. Liquid ammonia entering the second conduit 13 is vaporized in the section passing through the feed tank 25, thereby lowering the temperature and pressure in the feed tank in direct proportion to the amount of liquid ammonia carried over. For example, if the ammonia leaving the evaporator 12 contains 1 percent liquid ammonia, vaporization of the liquid ammonia in the feed tank would remove 5.7 BTUs from the ammonia in the feed tank for each pound of ammonia flowing through the second conduit 13. Thus, when the amount of ammonia having flowed through the second conduit 13 equals the amount of ammonia in the feed tank, the enthalpy of the ammonia in the feed tank is reduced by 5.7 BTUs per pound. Hence, the pressure in the feed tank would be reduced from 15.7 psig. to 12.2 psig., the temperature from 0°F. to −5°F, and the rate of flow from 100 percent to 77 percent. Carry-over of liquid ammonia in excess of 1 percent further reduces the flow up to a carry-over of about 5.3 percent, at which point the rate of flow is zero, as shown in the following table:

| % Liquid Carry-Over | Enthalpy of Liquid Ammonia in Feed Tank BTU/lb. | Feed Tank Pressure psig | Feed Tank Temp. °F. | % Flow |
|---|---|---|---|---|
| 0 | 42.9 | 15.7 | 0 | 100 |
| 1 | 37.2 | 12.0 | −5 | 77 |
| 2 | 31.5 | 8.7 | −11 | 55 |
| 3 | 25.8 | 5.6 | −16 | 36 |
| 4 | 20.1 | 3.1 | −21 | 20 |
| 5 | 14.4 | 0.7 | −26 | 4 |
| 5.3 | 12.7 | 0.0 | −28 | 0 |

A particular advantage of the embodiment of the invention shown in FIG. 2 is that the flow of ammonia to the evaporator 12 is variably regulated in response to the temperature of the ammonia leaving the evaporator down to the temperature of liquid ammonia (−28°F.). This permits one to attain the lowest possible temperature in the refrigerated compartment using an ammonia refrigeration system.

FIG. 3 illustrates a third embodiment of the invention. The ammonia storage tank 10, accumulator 15 and means for combusting vaporized ammonia 14 shown in FIG. 1 are omitted from FIG. 3.

The first constant pressure expansion valve 18 performs the same function in the embodiment of FIG. 3 as it does in the embodiments of FIGS. 1 and 2.

A second constant pressure expansion valve 20 is in parallel flow arrangement with the first expansion valve 18. Ammonia flows from the second thermostatic expansion valve 20 to a condenser 29. From the condenser 29, ammonia flows through a thermostatic expansion valve 30, a solenoid valve 19, and thence through the first conduit 11 to the evaporator 12, the conduit 11 passing through the condenser 29 in heat exchange relationship to the vapor therein. The second constant pressure expansion valve 20 is set at a pressure such that the maximum flow of ammonia through the solenoid valve 19 is not substantially greater than the combustion capacity of the means for combusting vaporized ammonia 14. Typically, this pressure would be about 20 psig.

As in the embodiments shown in FIGS. 1 and 2, the solenoid valve 19 is actuated by a thermostat 21 to control the flow of ammonia to the evaporator 12 in response to the temperature in the compartment being refrigerated. The solenoid valve 19 and the thermostat 21 are connected in series to a battery 23.

The thermostatic expansion valve 30 is actuated by a second thermostat 22 in heat exchange relationship with the ammonia leaving the evaporator 12. As the temperature of the ammonia approaches that of liquid ammonia, the valve 30 gradually closes to prevent liquid ammonia from entering the means for combusting vaporized ammonia 14.

I claim:

1. A refrigeration system for refrigerating a compartment comprising:
   a. a storage tank for liquid ammonia,
   b. an evaporator wherein the liquid ammonia is vaporized by absorbing heat from within the compartment being refrigerated,
   c. a first conduit for conveying liquid ammonia from the storage tank to the evaporator,
   d. means for combusting the vaporized ammonia,
   e. a second conduit for conveying the vaporized ammonia from the evaporator to the means for combusting the vaporized ammonia, the vaporized ammonia being permitted to flow unrestricted from the evaporator to the means for combusting the vaporized ammonia,
   f. interposed in the first conduit in parallel flow arrangement, an automatic expansion valve and means for regulating the flow of ammonia through the refrigeration system, said automatic expansion valve being set at a pressure such that the flow of ammonia through the valve is substantially equal to that required to sustain combustion in the means for combusting vaporized ammonia, 2. The refrigeration system of claim 1 wherein ammonia flows from the automatic expansion valve to an auxiliary evaporator and from the auxiliary evaporator to the second conduit, thereby bypassing the evaporator.

3. The refrigeration system of claim 1 including a heat exchanger and filter interposed in the first conduit, whereby as the liquid ammonia is cooled in the heat exchanger, oil inherently contained in the ammonia coalesces with foreign particulate matter in the ammonia to form a substance which is readily removed by the filter.

4. The refrigeration system of claim 1 wherein the means for regulating the flow of ammonia through the system includes a solenoid valve interposed in the first conduit, the solenoid valve being actuated by a thermostat in the compartment being refrigerated.

5. The refrigeration system of claim 4 wherein the solenoid valve is also actuated by a second thermostat in heat exchange relationship with the ammonia in the second conduit, whereby liquid ammonia is prevented from entering the means for combusting vaporized ammonia.

6. The refrigeration system of claim 4 wherein a second thermostat in heat exchange relationship with the ammonia in the second conduit actuates a thermostatic expansion valve interposed in the first conduit, whereby liquid ammonia is prevented from entering the means for combusting vaporized ammonia.

7. The refrigeration system of claim 4 wherein the means for regulating the flow of ammonia through the system includes an automatic expansion valve set at a pressure such that the flow of ammonia through the valve is not substantially greater than the combustion capacity of the means for combusting vaporized ammonia.

8. The refrigeration system of claim 4 wherein the means for regulating the flow of ammonia through the system includes a feed tank from which liquid ammonia flows through a capillary tube to the evaporator and from which vapor pressure above a desired value is released through a relief valve to the second conduit, the feed tank having means for regulating the level of liquid ammonia therein and the relief valve being set at a pressure such that the flow of liquid ammonia through the capillary tube is not substantially greater than the combustion capacity of the means for combusting vaporized ammonia.

9. The refrigeration system of claim 8 wherein a section of the second conduit passes through the feed tank in heat exchange relationship with ammonia vapor therein such that liquid ammonia in the section passing through the feed tank is vaporized, thereby reducing the pressure in the feed tank and the flow of liquid ammonia from the feed tank in direct proportion to the amount of ammonia vaporized in the section of the second conduit passing through the feed tank, whereby liquid ammonia is prevented from entering the means for combusting vaporized ammonia.

10. The refrigeration system of claim 4 wherein the means for regulating the flow of ammonia through the refrigeration system includes, in series, a second automatic expansion valve, a condenser, a thermostatic expansion valve and the solenoid valve, the second automatic expansion valve being set at a pressure such that the maximum flow of ammonia through the solenoid valve is not substantially greater than the combustion capacity of the means for combusting vaporized ammonia, the thermostatic expansion valve being actuated by a second thermostat in heat exchange relationship with the ammonia leaving the evaporator, and a section of the first conduit downstream from the solenoid valve passing through the condenser in heat exchange relationship with the ammonia vapor therein.

* * * * *